US005722317A

United States Patent [19]
Ghiron et al.

[11] Patent Number: 5,722,317
[45] Date of Patent: Mar. 3, 1998

[54] LOCAL MAGNETIC TEMPERATURE MEASUREMENT FOR ASEPTIC PROCESSING

[75] Inventors: Kenneth Marc Ghiron, Champaign; James Bruce Litchfield, Urbana, both of Ill.

[73] Assignee: The Board of Trustees of the University of Illinois, Urbana, Ill.

[21] Appl. No.: 632,173

[22] Filed: Apr. 15, 1996

[51] Int. Cl.$^6$ .............................. A61L 2/04; A23L 3/005
[52] U.S. Cl. .................... 99/452; 99/470; 99/483; 426/521; 426/522; 422/308; 422/111; 422/38; 422/23
[58] Field of Search ........................ 99/452, 470, 483; 374/163, 176; 426/522, 527, 523; 422/308, 111, 109, 38, 22, 23

[56] References Cited

U.S. PATENT DOCUMENTS

| | | |
|---|---|---|
| 4,044,238 | 8/1977 | Emschermann et al. |
| 4,637,936 | 1/1987 | White et al. |
| 4,850,270 | 7/1989 | Bronnert ............... 99/470 X |
| 5,080,164 | 1/1992 | Hermans . |
| 5,323,730 | 6/1994 | Ou-Yang . |
| 5,603,894 | 2/1997 | Aikus et al. ............ 99/483 X |

FOREIGN PATENT DOCUMENTS

| | | |
|---|---|---|
| 3140496A1 | 8/1982 | Germany . |
| 3140843A1 | 4/1983 | Germany . |
| 56-104228 | 8/1981 | Japan . |
| 57-079415 | 5/1982 | Japan . |
| 9429779 | 12/1994 | WIPO . |

OTHER PUBLICATIONS

"Safty Considerations in Establishing Aseptic Processes for Low–Acid Foods Containing Particulates", D.M. Dignan, M.R. Berry, I.J. Pflug and T.D. Gardine, Food Technology Mar. 1989 Symposium in Food & Science Technology, pp. 118–121.

"Establishing Aseptic Thermal Processes for Low–Acid Foods Containing Particulates", Dennis R. Heldman, from Food Technology Mar. 1989 Symposium in Food & Science Technology, pp. 122–123, Mar. 1989.

"Aseptic processing and Packaging"; R. Paul Singh, Dennis R. Heldman; Chapter 6 of Introduction to Food Engineering, Second Edition, pp. 244–258.

"Magnetic Determination of Average Catalyst Temperatures in Fluidized Beds", Timothy S. Cale and J.A. Merson, AIChE Journal, vol. 38, No. 9, Sep. 1992, pp. 1421–1428.

"Inductance Thermometry", R.H. Willens, from Temperature Its Measurement and Control in Science and Industry, vol. Four, Part 2, pp. 1137–1141.

(List continued on next page.)

*Primary Examiner*—Reginald L. Alexander
*Attorney, Agent, or Firm*—Greer, Burns & Crain, Ltd.

[57] ABSTRACT

An aseptic food processing system including a non invasive temperature measurement apparatus capable of processing low acid particulate foods. A magnetic particle is inserted into a food particle in the aseptic system and undergoes heating corresponding to a cold zone in the food product being processed. After heating, the particle is passed by one or more magnetic sensors disposed about the food stream path. The magnetic particle magnetizes in proportion to its magnetic susceptibility as it passes magnets included in the sensors. The particle is chosen to be paramagnetic at processing temperature ranges, and produces a magnetization in a sensor coil in the sensor which is proportional to the magnetic susceptibility. Because the susceptibility varies with temperature, actual temperature measurements of cold zone heating within the food particles may be obtained. The system may include a particle injector to inject the particle at a desired time, sensors to detect the temperature, data storage and process control based upon detected temperatures and a particle extractor.

14 Claims, 2 Drawing Sheets

OTHER PUBLICATIONS

"AC Bridge for High-Temperature Magnetic Thermometry", C.K.Cho, J.A.Merson, and T.S.Cale, Rev. Sci. Instrum., vol. 61, No. 8, Aug. 1990, pp. 2232–2235.

"Thermodynamic Temperature", T.J.Quinn, Chapter 3 of Temperature ©1983 from Monographs in Physical Measurement, pp. 108–115.

"Testing of Industrial Temperature Sensors in Liquids", R.K.Chohan, Int'l Journal of Energy Research, vol. 13, Nov. 6, Nov.–Dec. 1989, pp. 661–672.

"Magnetic Determination of Axial Catalyst Temperature Profiles", T.S. Cale, J.A. Merson, AIChE Journal, vol. 35, No. 9, Sep. 1989 pp. 1428–1436.

"Simulation of Parameters for Modeling Aseptic Processing of Foods Containing Particulates", Dilip I. Chandarana, A. Gavin III, and F.W. Wheaton, Food Technology, Mar. 1989, pp. 137–143.

"Experimental and Modeling Studies on Convective Heat Transfer at the Particle–Liquid Interface in Aseptic Processing Systems", Sudhir K. Sastry, Brian F. Heskitt, and John L. Blaisdell, Food Technology, Mar. 1989, pp. 132–136.

"Use of a Modified Ball's Formula Method to Evaluate Aseptic Processing of Foods Containing Particulates", John W. Larkin, Food Technology, Mar. 1989, pp. 124–131.

"JSME–International Journal Series B Fluids and Thermal Engineering", Y. Matsuno and k. Ohsima, 1995, Feb., V38, N1, pp. 73–78. ISSN 0914–8817.

LOCAL MAGNETIC TEMPERATURE MEASUREMENT FOR ASEPTIC PROCESSING

The present invention relates generally to a system and method for using an inserted magnetic particle to trigger a magnetic response from which accurate local temperature measurements may be obtained. More specifically, the present invention concerns a magnetic temperature measurement device for measuring a local temperature of moving product, such as food, having low magnetic susceptibility based upon the magnetic response induced by a paramagnetic particle inserted into the product as it passes one or more coils disposed adjacently to the flow of moving product. The present invention is especially adaptable to aseptic food processing techniques and allows measurement of local temperatures during aseptic processing. This helps insure guidelines concerning biological lethality during food processing are met.

BACKGROUND OF THE INVENTION

Aseptic food processing involves separate sterilization of the food product and the food package. After the separate sterilization, the product is inserted into the package in an environment which insures preservation of sterility until the package is sealed. This type of processing allows the use of lightweight and inexpensive packaging because the packaging is not required to withstand processing temperatures necessary to cook and sterilize the food. The alternative in-the-package food processing, such as the canning of soups, requires that the package withstand a heating process used to cook and sterilize of the food inside the package.

Many advantages are realized by adoption of aseptic processing, most of which relate to the conveniences associated with lightweight and inexpensive packages. These packages are less expensive to produce, cost lest to ship, and are more readily stacked and stored than conventional can alternatives. The so-called bag-in-box packaging used today in certain high acid and/or clear products, such as juices, is the result of aseptic processing and provides the aforementioned cost and convenience advantages over in-the-can sterility processing techniques.

Typical polymeric bag-in-box containers require that the product temperature during product insertion be less than approximately 32° C. The product is sterilized separately from the bag-in-box package through cooking and sterility heating. The package is sterilized through use of a disinfectant, such as hydrogen peroxide. Insertion of product into the package occurs in an environment which preserves sterility until sealing of the package. Use of aseptic packaging is becoming widespread, but is primarily limited to high acid foods because an efficient technique for obtaining food product sterility in low acid foods that may be monitored to suit government manufacturing standards has not been met.

The importance of sterility cannot be overestimated, as any sterility failure in a food processing system may result in sickness of persons consuming the product, and potentially even death. Acceptable aseptic processes must therefore insure that particular time and temperature profiles are produced during sterility processing of the food.

Preparation of acceptable quality food requires maintenance of a close tolerance between the lethality standards and actual conditions. If a manufacturer attempted to err on the side of substantial overheating to exceed lethality (a sterility measurement indicating killing of bacteria) requirements, then the taste, texture and quality of the food product would likely be adversely affected as a result of overcooking. Present manufacturing techniques and systems permit aseptic production of quality high acid and liquid food products because the high acid food products require less sever time-temperature sterility profiles, permitting less severe temperature processing. In liquid food products, heat transfer occurs in a more uniform manner, allowing estimation of food temperatures to be more accurate than in food products having a particle and liquid mixture. The liquid products are also unlikely to have cold zones and accurate temperature measurements simply require insertion of a thermometer into the liquid stream. Guarantee of food sterility is more complex in aseptic packaging of low acid foods, and foods containing a mixture of liquid and particles, where the inner particle temperature must be monitored.

Typical aseptic processing systems, such as those used to package fruit juices in bag-in-box containers, are designed to achieve a certain time and temperature profile during processing. Such systems generally include a deaerator which serves to remove oxygen prior to food heating. After the oxygen is removed, heat exchangers are used to heat the food product. The product is pumped from the heat exchangers into an inclined holding tube after which it is cooled. This tube forms a critical component in the aseptic process because the lethality is analyzed based upon the time temperature profile of the holding tube. After residence in the holding tube, food product is cooled and packaged in a sterilized package in an environment, such as steam, which preserves sterility until the package is sealed.

Generally, heat transfer imparted to the liquid foods may be measured precisely enough to guarantee that lethality is achieved, and the liquid temperature may also be easily measured. The design of the heat transfer and holding tubes of the heat exchangers is based upon the heat transfer calculations to insure that the liquid is sterilized in accordance with accepted standards. Standards are complied with by maintaining operating conditions to impart a heating profile to the food being processed which conforms with regulatory standards, and by monitoring temperature during processing.

The measurement and heat transfer modeling is much more complex in liquid foods including particles. The already complex heat transfer equations which define liquid aseptic processing and allow implementation of practical systems for liquids are complicated by the presence of particles. In liquid foods including particles, such as gravy, soup, stews, fruit in liquid, and other .similar products, heat transfer depends on the interaction between the particles and liquid, residence times for liquids and particles, and other factors which complicate analysis. In the liquid-particulate mixtures, the slowest heating location will be at the center of the largest particulate (assuming conventional non-microwave heating). This "cold zone" point accordingly becomes important because the aseptic processing time-temperature profile for this cold zone must be sufficient to achieve required lethality.

While system design and operating conditions are critical to aseptic processing, direct measurement of food product during processing provides an important standard and safeguard for achieving lethality and food product safety. In addition, some type of temperature measurement is necessary to satisfy periodic inspections. Various temperature measurement techniques have been proposed, which have limited applications in the aseptic particulate food processing systems.

One measurement technique introduces liquid crystals into the stream of food product. These crystals are examined by optical sensors at various points in the food product stream, and measurements concerning transmitted and reflected light are obtained. Polarization of the light changes as a function of temperature, which permits calculation of temperature. This technique is limited to generally transparent liquids, which permit reasonable optical examination of liquid crystals.

Another technique introduces a transmitter into the food product which directly measures and transmits information concerning the temperature of the food product. These transmitters are generally unreliable in the aseptic processors, and may produce inaccurate information after being agitated and heated in the flow of food product. Still other techniques include measurement of chemical reactions or bacteria reactions in the food product. Samples including well understood bacterial or chemical reactions are inserted upstream and later withdrawn from the food product stream. Significant delays are introduced by the need to test and analyze the bacterial or chemical samples, and the practical utility of the bacterial and chemical techniques is accordingly limited. In addition, introduction of bacterial spores or chemicals for reaction raises separate safety concerns.

Because of these and other concerns, it is believed that a practical technique for such local temperature measurements in aseptic processing of low acid particulate foods has yet to be implemented, and is not in commercial use. The adoption of a technique which would permit accurate local temperature measurement in low acid particulate foods will permit the significant advantages of aseptic processing to be expanded to new food types. Benefits of such extension include reduction in energy consumption during processing, use of lightweight and low cost packages which reduce handling costs and machine wear, and use of square or rectangular shaped packages, achieving higher packing densities than are realized with convention round can or jar packaging. In addition, aseptic processing provides more uniform product heating than in-the-package heating thereby improving overall product quality.

Accordingly, it is an object of the present invention to provide a method and apparatus for efficiently and accurately measuring local temperatures within a moving flow of product.

Another object of the present invention is to provide a method and apparatus for measuring local temperatures in an aseptic processing systems which can accurately measure temperature-time profiles to insure that lethality standards are met during aseptic processing.

Another object of the present invention is to provide a method and apparatus for measuring local temperature in an aseptic food processing system based upon a temperature dependent magnetic response of a magnetic particle inserted in to the food product being processed.

A further object of the present invention is to provide an aseptic food processing system including a vat heater for heating food product to a base temperature, heat exchangers for heating and cooling food, and a holding tube, where a paramagnetic particle is introduced into a local cold zone within a food product stream and is heated with the cold zone, and the system includes a sensor for measuring a magnetic response induced by the moving paramagnetic particle as it passes through a magnetic field from which local cold zone temperature may be determined.

A still further object of the present invention is to provide an aseptic food processing system including a vat heater for heating food product to a base temperature, heat exchangers for heating and cooling food, and a holding tube, where a paramagnetic particle, having a magnetic susceptibility of at least three orders of magnitude higher than the food product and no higher than approximately 3 (in MKSA units), is introduced into the food product stream in a local cold zone within the food product stream, and the system includes a sensor for measuring a magnetic response induced by the moving paramagnetic as it passes through a magnetic field from which local temperature may be calculated.

An additional object of the present invention is to provide a method and apparatus for accurately and periodically measuring local temperatures in a food product stream within an aseptic food processing system which is equally applicable to pure liquid and low acid particulate liquid food product mixtures.

SUMMARY OF THE INVENTION

The above-listed objects are met or exceeded by the present aseptic processing system. The present invention takes advantage of the strongly temperature dependent magnetic properties of paramagnetic particles. Insertion of such a magnetic particle into a product, such as food, being aseptically processed permits measurements to be taken reflecting the temperature of the magnetic particle as the magnetic particle passes one or more critical points within the product processing stream. Because the magnetic particle may be easily detected, the particle may also be conveniently removed from the product processing stream prior to packaging. Use of magnetic particles which are fit for consumption in small concentrations would obviate the need to extract the magnetic particle prior to packaging.

In a preferred embodiment, a magnetic particle is inserted into an aseptic food processing system manually, through a valve, or by other suitable means. The food may be a low acid food product including particles, in which case the magnetic particle is inserted in the food stream in the center of a particle corresponding to a cold zone in the food product stream. Preferably, the magnetic particle has a magnetic susceptibility a few orders of magnitude higher than the food product itself, but not exceeding a susceptibility of approximately 3 (MKSA units). In addition, the particle is preferably paramagnetic at the food processing temperatures. The magnetic particle is heated and cooled with the food product, and flows along the same path as the food product through the aseptic food processing system. The temperature of the particle is calculated from a magnetic response induced in a sensor coil disposed adjacently to a portion of the food processing path as the magnetic particle passes through a magnetic field. Preferably, multiple sensors are disposed along a holding tube portion of the aseptic food processing system to permit a time and temperature profile of food particle cold zone to be obtained.

A preferred aseptic food processing system constructed in accordance with the present invention includes an injector for injecting a particle into a food processing stream. The time at which the magnetic particle enters the system may be monitored by a processing computer to permit heating coefficient calculations. At the time of introduction the particle temperature is known. A pump moves the food product and inserted magnetic particle into a heat exchanger which heats the food product and magnetic particle. From the heat exchanger the food product is moved into a holding tube having one or more sensors for detecting the response induced by the magnetic particle from the passing of the magnetic particle past the sensor and through a magnetic field. The temperature is calculated from the response induced in the sensor by the magnetic particle in a processor, which may also store information concerning the temperatures sensed within the food product stream. Another approach is for the processor to attempt to fit the sensor response to an ideal response indicative of an acceptable time-temperature profile. After exiting the holding tube, the food product is cooled in a cooling heat exchanger, and may be extracted by a valve which responds to an additional sensor used to detect the particle. Assuming that required temperature characteristics were measured, the food product is then inserted into a separately sterilized package. The packaging operation may be automatically prevented if either the measured temperature characteristics were unsatisfactory, or a sensor used to confirm magnetic particle extraction indicates that extraction was unsuccessful.

BRIEF DESCRIPTION OF THE DRAWINGS

Other features, advantages and objects of the invention will be readily apparent to those skilled in the art by reference to the detailed description and drawings, of which.

DETAILED DESCRIPTION OF THE PREFERRED EMBODIMENT

Aseptic Food System Heating and Flow

Figure 1:
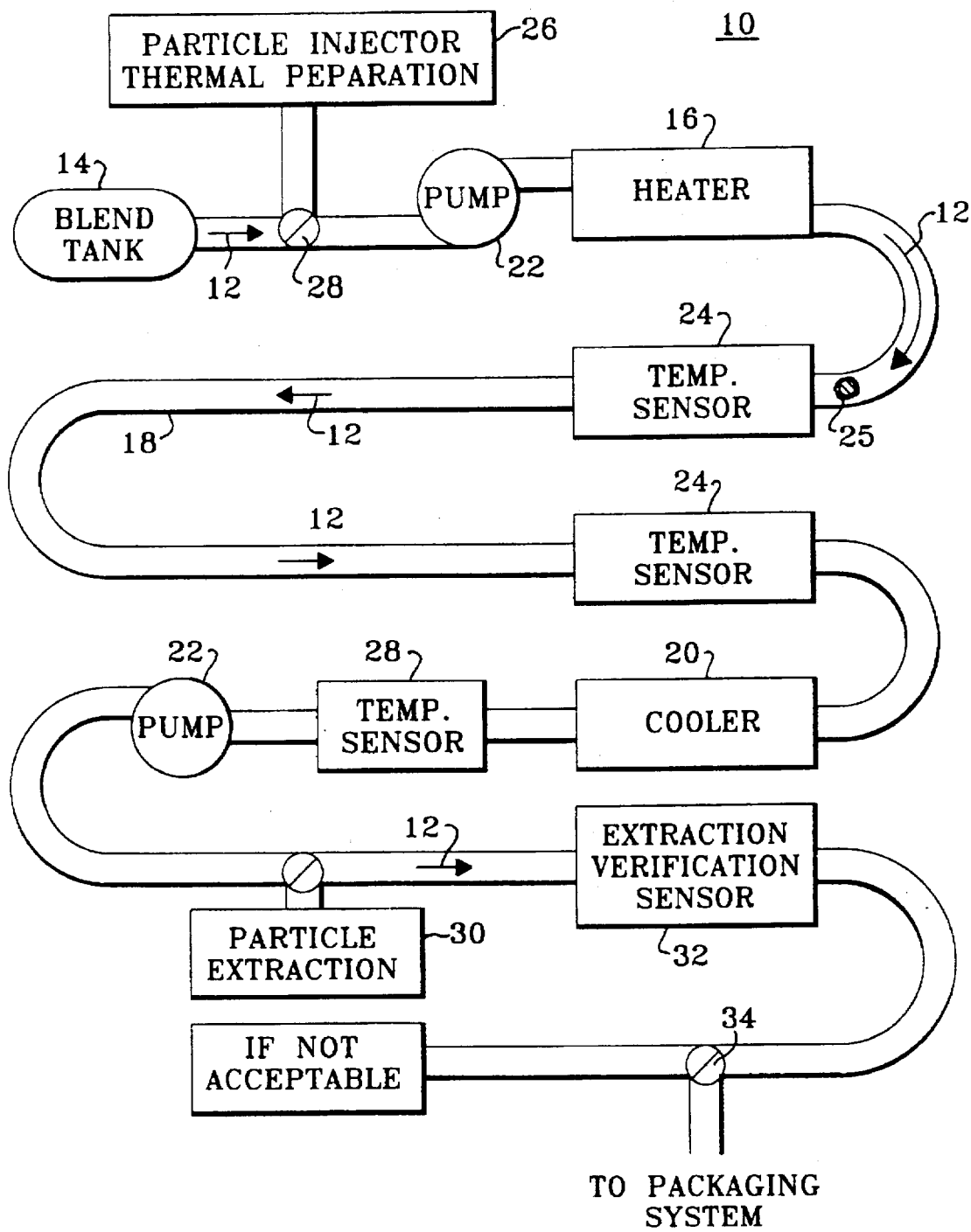
FIG. 1 is a block flow diagram of preferred embodiment of an aseptic food processing system including a magnetic particle temperature determination apparatus constructed in accordance with the present invention.

Referring now to FIG. 1, shown is an aseptic food processing system 10 constructed in accordance with the present invention. Similarly to conventional aseptic food processing systems, food product and food package are separately sterilized and then the food is inserted into packaging after sterilization. Sterilization of the package is accomplished by an accepted conventional technique such as hydrogen peroxide sterilization.

Sterilization of the food product is accomplished through heat processing as the food is moved along a food stream path defined by arrows 12. Mixing and initial heating, sterilization heating, lethality holding and cooling are respectively accomplished by a blend tank or vat 14, heat exchanging heater 16, holding tube 18, and heat exchanging cooler 20. Food product is moved along the food stream path 12 with the assistance of one or more pumps 22. Pumps 22 operate under control of metering valves to maintain a desired food product flow rate through the aseptic processing system 10. The flow rate and temperature parameters of the heat exchangers 16, 20, and holding tube 18 are designed to meet lethality standards without destroying the taste and texture of the food product.

Exemplary temperature and residence time design considerations based upon mathematical modeling for heat transfer to low acid particulate mixture foods undergoing aseptic processing are discussed in an articles, incorporated by reference herein, by C. M. Dignan et at. "Safety Considerations in Establishing Aseptic Processes for Low-Acid Foods Containing Particulates", and by Dennis R. Heldman, "Establishing Aseptic Thermal Processes for Low-Acid Foods Containing Particulates", from the Food Technology symposium "Establishing Aseptic Thermal Processes for Liquid Foods With Solid Particulates". A more general overview of aseptic healing and cooling component design may be found in chapter 6 "Aseptic Processing and Packaging" of the book "Introduction to Food Engineering" by Singh and Heldman, second edition 1993, pp. 244–58.

Each of these publications focuses upon the design considerations to achieve a desired lethality rate during aseptic food processing, while acknowledging the mathematical difficulties encountered when modeling heat transfer to particles having cold zones within a stream of food product. Accordingly, designs err on the side of exceeding necessary temperature-residence time profiles in the interest of safety. Validation of even the conservative designs is difficult because the simulated particle bacterial spore measurement techniques typically used to test the process results are not readily adapted to practical processing systems. Barriers to optimizing and commercializing the various processing design techniques center largely upon the inability to obtain accurate information concerning heat transferred to particle cold zones.

In particular the convective heat transfer coefficient used to model heat transfer from liquid to solid is not well understood. Prior efforts to measure this coefficient have been largely ineffective, and an accurate coefficient may not have been obtained. The invention provides a method to determine the coefficient because it measures both residence time and temperature gain at a selected particulate location during processing.

Temperature Measurement in the Aseptic System

These difficulties are overcome by the aseptic food processing system 10 constructed in accordance with the present invention. The system 10 obtains temperature measurements of a food particle including a magnetic particle 25 intentionally inserted into the food particle as the particle passes one or more magnetic temperature sensors 24 respectively disposed along the food stream path 12. Preferably, at least two temperature sensors 24 are disposed at the entrance and exit of the holding tube 18 to permit a residence time and temperature profile to be obtained from the temperature measurements of the temperature sensors 24.

A magnetic particle 25, for instance chromium dioxide, is inserted into a food particle corresponding to the largest food particles being processed in the aseptic processing system. The magnetic particle 25 may be manually inserted into a large food particle. While it is possible to then insert the implanted food particle within the blend tank 14, the preferred technique uses a particle injector 26 and valve 28 assembly so that the implanted food particle may be introduced at desired time. The particle injector 26 may simply comprise a much smaller vat or blend tank which models the heating and temperature conditions within the main blend tank 14. The valve 28 may comprise a ball valve, which presents a wide opening. A solenoid (not shown) could be used to allow the valve to be controlled by a computer in accordance with a food particle temperature monitoring program.

Once the food particle including the inserted magnetic particle 25 exits the heat exchanger cooler 20, an additional temperature sensor 28 may be used to obtain exit temperature information, and also to instruct a particle extraction valve assembly 30 to open and extract the food particle including the magnetic particle 25. A solenoid and ball valve assembly which opens for a limited time in response to a timed computer signal triggered by the extraction sensor 28 is suitable for the valve assembly 30, and will extract a small amount of food product including the food particle having the magnetic particle 25 inserted therein. Extraction is verified by another sensor 32, which determines whether a packaging valve 34 should permit food product to be directed toward packaging or be rejected if it is not acceptable. This valve 34 may also be a solenoid controlled ball valve, and should also be controlled in accordance with temperature profile information obtained by the temperature sensors 24. Where the sensors indicate that a required temperature lethality profile has not been met, the valve 34 should not permit food product to flow to packaging until system conditions are modified to meet necessary lethality profiles. Unsatisfactoy temperature profile matching may also be used to trigger alarms on a master process control panel (not shown). The extraction sensor 28, extraction valve 30, and extraction verification sensor 32 may be omitted fi a magnetic particle 25 fit for consumption in small quantifies, and approved by the FDA, were used to trigger the temperature sensors 24. In that case, the valve 34 would be controlled solely on the determination relating to temperature profile.

Magnetic Temperature Measurement Sensor

Figure 2:
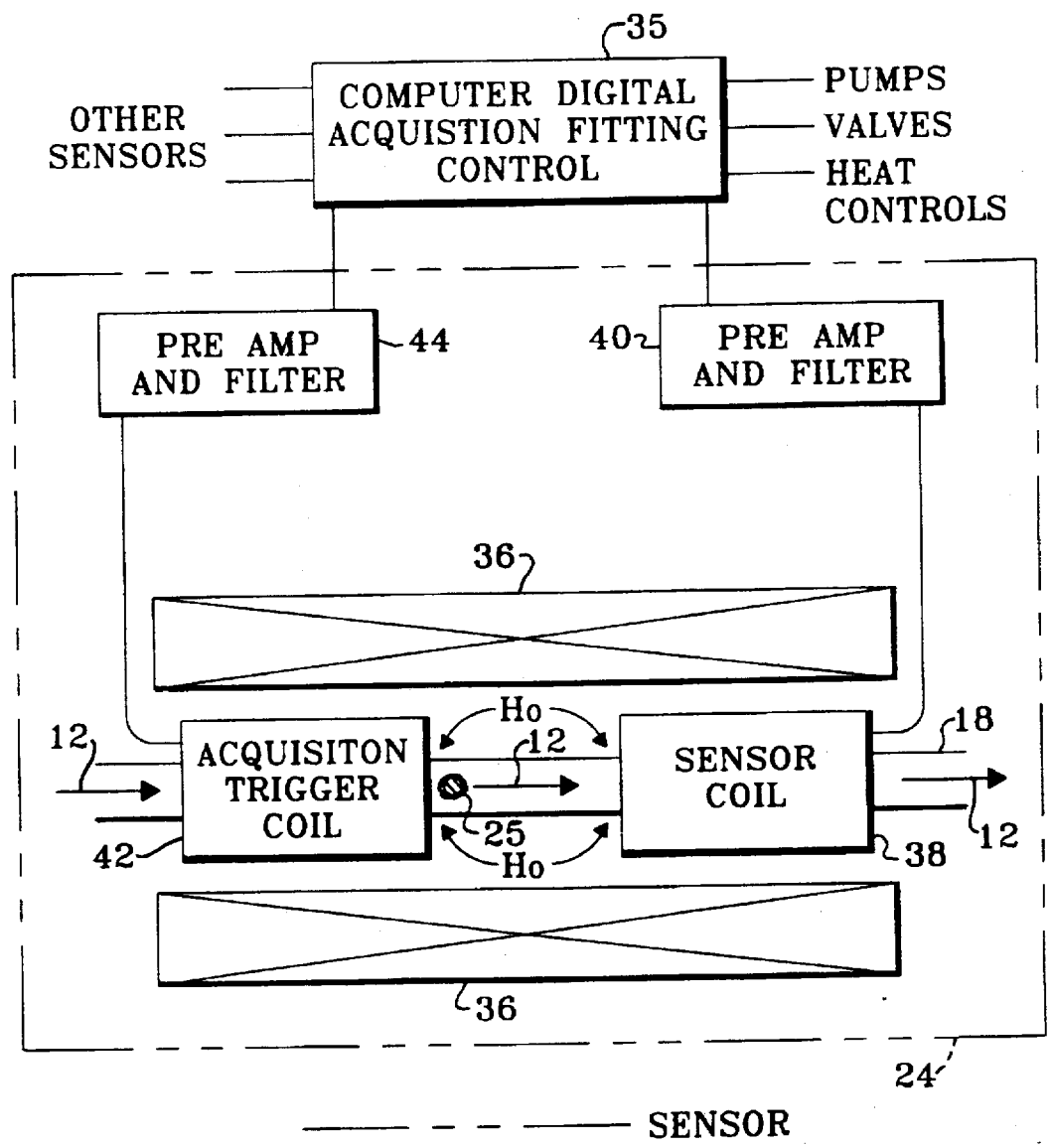
FIG. 2 is a block diagram of the sensor and related hardware from the aseptic food processing system illustrated in FIG. 1.

Referring now to FIG. 2, a preferred construction for the magnetic temperature sensor 24 is illustrated along with a processing computer 35. The temperature extraction sensor 28 and extraction verification sensor 32 may be identical in construction to the temperature sensors 24. However, because these sensors examine cooler particles, and because they do not need to obtain accurate temperature profile information, the sensors may be less sensitive. The processing computer monitors the temperature sensors 24, and instructs and monitors other system components in accordance with temperature profiles obtained from the sensors 24. Accordingly, operation characteristics of the pumps 22 and heat exchangers 16 and 20 may be altered by the computer to change temperature and residence times to meet a lethality rate time and temperature profile.

The temperature sensors 24 include magnets 36 and a sensor coil 38 disposed around the food stream path 12 within the holding tube 18. Voltage is induced in the sensor coil 38 in response to the passing of a food particle including an inserted magnetic particle 25. The amplitude of the signal produced in the coil is a function of the magnetization of the magnetic particle 25, which varies according to temperature. Because of the dependence on temperature, the temperature of the food particle at its cold zone may be accurately calculated. Signals from the sensor coil 38 are amplified and noise filtered by an amplifier and filter 40. The computer 35 includes an A/D conversion board to perform digital acquisition of the signal from the amplifier 40. Once the signal is obtained, the magnetic particle susceptibility may be determined by fitting the signal with a theoretical curve. Because the susceptibility varies according to the temperature of the magnetic particle, temperature may be calculated from the susceptibility. Adequate lethality may be monitored by determining the temperature of the particle and the time at which it passed various points in the system 10, e.g. obtaining temperature and residence time information. If variance from a lethality temperature-time profile is detected by the computer 35, the computer 35 may issue an alarm and/or modify settings to adjust product flow rate, as determined by the pumps 22, or adjust the heater 16 heat controls.

The computer 35 also controls the opening and closing of valve assemblies 28, 30 and 34. Valve 28 is opened to inject a food particle including the magnetic particle 25 and begin a temperature monitoring operation by the computer 35. Valve 30 is opened after the extraction sensor 38 detects the magnetic particle 25 so that the particle and a small mount of food product are diverted, and then is closed again. Finally, the valve 34 responds to both the extraction verification sensor 32, and the result of fitting of measured voltage profile a theoretical (designed) lethality profile within the computer 35. If either the particle 25 is not extracted, or the profile is not adequately matched, the valve 34 is set to prevent flow of food to the packaging system. The valve 34 could be opened again to permit packaging when sufficient time has passed to allow the magnetic particle 25 to be diverted if the extraction was unsuccessful, and after temperature conditions have been restored as indicated by the sensors 24 if lethality conditions were violated.

Also shown in FIG. 2 is an acquisition trigger coil 42, having an amplifier 44 which may be used to initiate the digital acquisition of the computer 35. A signal from the acquisition coil 44 may initiate acquisition and digitization of the signal from the coil 38, as well as storage of digitized signals from the coil 38, to reduce overall memory usage. Using of the separate trigger coil 42 is not necessary, but insures that the entire signal created by the magnetic particle 25 in the sensor coil 38 is processed and stored. The storage of the relevant signals from the coil 38 provides an operation record for system inspections and maintenance.

Inserted Magnetic Particle 25 Interaction with Sensor Coils

The magnetic particle 25 inserted into the center of a food particle is preferably spherical so that uniform magnetization occurs within the magnetic particle 25. A spherical magnetic particle 25, such as chromium dioxide, inserted into a food particle cold zone will undergo uniform magnetization in the same direction as an external field $H_0$ generated by the magnets 36. This magnetization M is a function of the susceptibility $\chi$ of the material of the magnetic particle 25 and the magnetic field $H_0$:

$$M = \frac{H_0 \chi}{1 + \frac{\chi}{3}} \quad (MKSA \text{ units})$$

As is apparent from the magnetization relationship, the magnetization M will have a significant dependence on $\chi$ as long as $\chi$ is not much larger than 3 (MKSA). Thus, the susceptibility of the particle should not exceed approximately 3 for use in the aseptic food processing system of the present invention. Because the susceptibility of the particle is the quality which varies with temperature, the varying susceptibility as indicated by the magnetization may be used to determine temperature. For values much larger than 3, the magnetization essentially becomes independent of susceptibility, and therefore independent of temperature variation.

The lower bound of susceptibility should be a few orders of magnitude larger than the susceptibility of the food product. While the susceptibility of food products, such as potato particles, has been measured as on the order of $10^{-6}$, such a susceptibility is not sufficient to create a meaningful signal in typical coil and magnet assemblies on a single pass through the magnetic field $H_0$. Nonetheless, the lower bound of the magnetic particle susceptibility should exceed the food particle susceptibility by approximately $10^3$ or more, so that the signal due to the magnetic particle 25 is well distinguished from even a small signal created by the larger but less magnetic food particles themselves. Because the magnetic particles' susceptibility varies over temperature, the susceptibility should remain in the lower and upper bounds throughout a generous range of potential temperatures which may be encountered in the aseptic processing system 10, including temperatures indicative of both adequate and inadequate sterilization heating.

It is also important for the magnetic particle 25 to be paramagnetic, as opposed to ferromagnetic, in the operating temperature range, to eliminate dependence of the magnetism on the history of the magnetic field $H_0$. One suitable particle, chromium dioxide, is manufactured in large quantities for use in recording tapes, and becomes paramagnetic at approximately 120° C., well below expected satisfactory and unsatisfactory cold zone heating temperatures in an aseptic processing system. Gd is paramagnetic at less than room temperature, and has susceptibility close to one (0.8) at room temperature. Another particle which has acceptable characteristics is $(Co_xMn_{1-x})_2P$.

Given an acceptable paramagnetic spherical magnetic particle inserted into a food particle cold zone, the particle will create a magnetic flux in the sensor coil 38 (and also the trigger coil 42) as it passes along an axis of the coil 38 defined by the food stream path 12. If the coil is a circular conducting coil of radius R, the coil has N turns, $\rho$ is the radius of the magnetic particle 25, $\mu_0$ is the permeability constant of the particle, and the particle is distance Z away from the coil, the magnetic flux will be defined by either:

$$\phi = 2\pi \frac{N\mu_0 H_0 \rho^3 \chi R^2}{3+\chi} \left[ \frac{1}{Z^2 + R^2} \right]^{\frac{3}{2}}$$

or, after substitution of magnetization M according to the magnetization-susceptibility relationship:

$$\phi = 2\pi \frac{N\mu_0 M\rho^3 R^2}{3} \left[ \frac{1}{Z^2 + R^2} \right]^{\frac{3}{2}}$$

Thus, the magnetic particle 25 inserted into a cold zone of the food particle moving at a velocity V along the coil axis at Z distance from the coil induces a time dependent flux that produces a voltage in the coil 38. The voltage is proportional to the velocity of the motion of the magnetic particle 25, and also the susceptibility of the particle, which is empirically related to particle temperature.

The voltage in the sensor coil 38 is the time derivative of the flux created by the magnetic particle 25. If the particle is moving with a constant velocity v, the position Z is defined by Z=vt+c, where c is the position of the particle with respect to the coil at t=0. Accordingly, the voltage produced in the coil may be expressed as:

$$V = 2\pi \frac{N\mu_0 H_0 \rho^3 \chi R^2}{3+\chi} [3v(vt+c)] \left[ \frac{1}{(vt+c)^2 + R^2} \right]^{\frac{5}{2}}$$

In the sensor coil 38, the voltage peak timing will determine c, while the width of the voltage peak determines v. Factoring out velocity allows the susceptibility $\chi$ to be determined, as well as the magnetization M. A three parameter fit of the voltage signal may be used to determine $\chi$, v and c. Fitting is further simplified by using two sensors 24, as illustrated in FIG. 1, at different locations because the velocity can be directly calculated based upon the time taken for the particle to travel between the two sensors. The sensor coil 38 induction method is a specific way to determine magnetization of the magnetic particle 25, but other methods should be acceptable and will also allow determination of particle temperature.

The magnetic particle 25 may move within some limited area in the food product flow path 12, and accordingly is not confirmed to movement along the exact central longitudinal axis of the sensor coil 38 may occur. Variation of the position with respect to the longitudinal axis of the sensor coil 38. Such variation will modify the magnitude and time dependence of the voltage in the sensor coil 38, but if the radius of the sensor coil 38 is significantly larger than the inner diameter of the holding tube 18, the variation is negligible and may be ignored. Alternatively, the voltage can be calculated for the particle along a line parallel to the coil axis. Distance between on axis and off axis trajectories is determinable in a four parameter fit, e.g. using Z, $\chi$, c, and v.

Calibration of the sensor 24 should be periodically conducted under controlled conditions because parameters of the sensor 24 may not be initially known, and may vary over time. For instance, the magnetic field $H_0$ may vary somewhat over time, or amplifier gain may drift. Standard materials, having known susceptibility-temperature relationships, such as Ni and Pd, may be used as standards for calibration of the sensor to measure $H_0$, and amplifier gain.

The magnetic field $H_0$ created by the magnets 36 in the aseptic processing system should be large enough to induce sufficient particle magnetization to create a voltage which is easily distinguishable in the sensor coil 38. Stable permanent magnets creating a magnetic field $H_0$ on the order of 1 kG should be adequate for the aseptic processing system 10. As is apparent from the above magnetization M equation, the susceptibility (which varies with temperature) will still alter the magnetization according to particle temperature, but the substantial 1 kG magnetic field keeps the magnetization in a correspondingly substantial range. Changes in voltage resolution as the susceptibility and magnetization of the magnetic particle 25 temperature changes are more easily detected in a substantial voltage range as defined by the substantial 1 kG magnetic field.

Maximization of the temperature dependence of the magnetic particle 25 (for better temperature measurement resolution) requires use of a material for the magnetic particle 25 which has a temperature dependent susceptibility near 1. Materials meeting this criteria include Gd, $CrO_2$, and $(Co_xMn_{1-x})_2P$. However, if the magnetic particle 25 chosen varies greatly from the preferred spherical shape, then it is better to use a particle having a lower susceptibility to reduce the dependence of the coil voltage signal on the orientation of the particle. A cube, or cylinder with a length 10 percent less than its diameter might be acceptable alternative and easy to manufacture shapes for the magnetic particle.

The sensor coil 38 must have a larger radius than the inside diameter of the holding tube 18. Commercial magnetometers including a magnet and coil usable as the magnet 36 and sensor coil 38 generally confine the particle to be sensed within a tube having a radius of approximately ⅕ or less than the radius of the coil. According to this convention, an acceptable holding tube 18 could have a radius which is approximately ⅕ the radius of the sensor coil 38.

Use of two coils wound in opposite directions for the sensor coil 38 will make the sensor coil 38 less responsive to external noise. A typical configuration would separate the two opposing coils by a distance equal to the diameter of the coils. The coils are connected in series and the voltage signal is obtained from the series connected coils. Other known and more complex coil geometries may also be used to eliminate external noise. Alternatively or additionally, the sensors 24 might include external shields to reduce the influence of external noise.

Experimental Temperature Determinations

Aseptic holding tube conditions were simulated to test the temperature detection feature of the present invention by passing magnetic particles 25 through a magnetic field and past a conducting pick up coil. Signals from the coil were magnetized and observed on an oscilloscope. A similar empirical method can be used to establish operating magnetic particle voltage-temperature relationships for the sensors 24 in the aseptic food processing system after the magnetic field $H_0$ and particle type and size were selected.

A prototype sensor was constructed by 270 turns (N) of 0.0016" wire wound around a 3" long segment of commercial PVC pipe. The coil was bracketed by 4" annular ceramic magnets which slipped over the ends of the pipe segment, creating a field $H_0$. The PVC pipe had a 0.600" inner diameter, a 0.825" outer diameter within the coil, and a 0.800" (machined) diameter within the magnets. The field $H_0$ along the axis of the coil was less than approximately 150 Oe. Outside influences were eliminated by mounting the sensor in a 3"×4"×5" aluminum box. The coil was connected to an EG & G Princeton Applied Research model 1900 low noise preamplifier set for a 1000×amplification of the sensor voltage through a BNC coax cable, the outer conductor of which was grounded on the aluminum box.

For a low acid particulate food product test, peas including magnetic particles 25 inserted therein were heated and placed in a reservoir filled with water. The magnetic particles 25 were heated by applying DC current to 0.003" constantain wire having a resistance of about 16–20 ohms wrapped around magnetic particle 25 and attached with masking tape. The temperature of the heated particles was directly measured with a copper-constantain thermocouple which was soldered together and taped to the sample with masking tape.

The reservoir drained through flexible tubing around which the experimental sensor was placed. Plain food particles and liquids were first passed by the coils after the stream velocity of the experimental system was determined to be about 0.2 m/s. The passing of the particles by the experimental sensor induced voltages from which a temperature relationship could be established, based upon the direct temperature measurements.

A gadolinium particle Gd was used as the experimental particle. The particle was in the shape of a triangular prism, having a length of 0.11", a base of 0.08"0.11"×0.11". The following coil 1000×amplified voltage temperature relationships were established during a preliminary empirical voltage-temperature test which suspended the particles on a spring and passed the particles by the sensor, and were measured in the liquid stream experiment:

| Temperature °F. | Signal (mV) |
|---|---|
| 68.2 | 64 |
| 71.4 | 40 |
| 74.2 | 20 |
| 85.0 | 10 |
| 100 | 4 |
| 120 | 2 |

As seen in the table, the inverse of the susceptibility of the particle becomes approximately linear above room temperature, in correspondence to the conversion of the particle from ferromagnetic to paramagnetic after it is heated. Similar results were produced using a $CrO_2$ sample in the spring experimental set up which directly passed 30 mg of the powder in a brass tube suspended on a spring past the experimental sensor. The $CrO_2$ testing yielded the following temperature-voltage relationships:

| Temperature °F. | Signal (mV) |
|---|---|
| 143 | 50 |
| 155 | 40 |
| 160 | 30 |
| 170 | 12 |
| 175 | 6 |
| 185 | 3 |
| 165 (cool down) | 20 |

Processing Application

Determination of actual temperature, especially in low acid particulate food products, will allow actual on-site periodic monitoring of cold zone food processing conditions. This physical measurement may be used to validate aseptic system designs having a mathematically predicted lethality rate for low acid particulate food processing systems and allow on-site operating adjustments to be made. The practical temperature measurement included in an aseptic food processing system constructed in accordance with the present invention will permit optimization of system parameter designs based upon mathematical models to balance the sometimes opposing goals of sufficient lethality rate and acceptable cooking (without overcooking) of food product. Data obtained concerning local temperatures in cold zones by actual measurements in accordance with the present invention should permit satisfaction of FDA standards, continuous safety monitoring, and the ability to adjust system parameters to keep desired cooking and lethality rates within an acceptable range. Practical expansion of aseptic food processing into low acid particulate foods should allow the convenient and low cost box packaging to replace more expensive and inefficient can processing techniques.

While the illustrated preferred embodiment achieves all of these advantages, it will be appreciated by those skilled in the art that changes and modifications may be made thereto without departing from the invention in its broader aspects and as set forth in the following claims.

What is claimed is:

1. An aseptic processing system for processing a product by monitoring a magnetic particle in the product comprising:

a product stream path through which said product and said magnetic particle flow during processing;

moving means for moving said product and said magnetic particle through said product stream path;

a heater for heating said product and said magnetic particle; and temperature sensor means for sensing a local temperature within said product in said product stream path based upon an amount of magnetization of said magnetic particle as it passes said temperature sensor means.

2. An aseptic processing system in accordance with claim 1, wherein said temperature sensor means comprises:

magnetic field means for subjecting said magnetic particle to a magnetic field; and magnetization sensing means for determining said amount of magnetization of said magnetic particle which is indicative of temperature.

3. An aseptic processing system in accordance with claim 2, wherein:

said magnetic field means comprise a magnet disposed adjacently to said product stream path; and said magnetization sensing means comprise a sensor coil for picking up a voltage corresponding to the amount of magnetization of said magnetic particle and to the temperature of magnetic particle.

4. An aseptic processing system in accordance with claim 3, wherein said magnetic particle is paramagnetic at system operating temperatures, and has a magnetic susceptibility which varies with temperature.

5. An aseptic processing system for processing a product by monitoring a magnetic particle in the product comprising:

a product stream path through which said product and said magnetic particle flow during processing;

moving means for moving said product and said magnetic particle through said product stream path;

a heater for heating said product and said magnetic particle; and temperature sensor means for sensing a temperature within said product in said product stream path based upon an amount of magnetization of said magnetic particle as it passes said temperature sensor means;

wherein said magnetic particle is paramagnetic at system operating temperatures and has a magnetic susceptibility which varies with temperature, said product is a low acid particulate food, and said magnetic particle is within a food particle within said food.

6. An aseptic processing system in accordance with claim 5, wherein said magnetic particle is within a cold zone of said food particle, and said temperature sensing means develops a voltage that corresponds to the temperature of said cold zone.

7. An aseptic processing system for processing a product by monitoring a magnetic particle in the product comprising:

a product stream path through which said product and said magnetic particle flow during processing;

moving means for moving said product and said magnetic particle through said product stream path:

a heater for heating said product and said magnetic particle:

temperature sensor means for sensing a temperature within said product in said product stream path based upon an amount of magnetization of said magnetic particle as it passes said temperature sensor means;

a magnetic particle injector for injecting said magnetic particle into said product stream path upstream of said heater; and a magnetic particle extractor for extracting said magnetic particle from said product stream path downstream from said temperature sensor means.

8. An aseptic processing system for processing a product by monitoring a magnetic particle in the product comprising:

a product stream path through which said product and said magnetic particle flow during processing;

moving means for moving said product and said magnetic particle through said product stream path;

a heater for heating said product and said magnetic particle;

temperature sensor means for sensing a temperature within said product in said product stream path based upon an amount of magnetization of said magnetic particle as it passes said temperature sensor means; and temperature processing means for fitting said voltage to a theoretical lethality voltage to determine if a suitable product lethality temperature has been achieved.

9. An aseptic food processing system in accordance with claim 8, further comprising:

second temperature sensor means disposed adjacently to a portion of said product stream path for sensing a temperature within said product stream path as it passes said temperature measurement means, said second temperature sensor means having a magnet for magnetizing said magnetic particle; and a coil for picking up a voltage corresponding to the magnitude of magnetization of said magnetic particle and the temperature of the magnetic particle, wherein said temperature processing means uses voltage signals from coils of both said temperature sensor means and said second temperature means to determine the velocity of said magnetic particle, and calculates the temperature of said magnetic particle based upon the determined velocity.

10. A method for detecting the temperature of a selected portion of a product being processed in an aseptic processing system comprising the steps of:

inserting a magnetic particle into a selected portion of said product;

heating said magnetic particle with said product;

passing said magnetic particle through a magnetic field;

sensing a signal corresponding to an amount magnetization of said magnetic particle in the presence of said magnetic field;

determining the temperature of said selected portion of said product from a magnetic particle magnetization to temperature empirical relationship.

11. A method in accordance with claim 10, wherein said magnetic particle is paramagnetic after said step of heating, and magnetizes in proportion to temperature.

12. A method in accordance with claim 11, where said magnetic particle 25 has a magnetic susceptibility which is approximately $10^3$ (MKSA) greater than a magnetic susceptibility of said product, and no greater than approximately 3 (MKSA).

13. A method in accordance with claim 12, wherein said step of sensing comprises sensing a voltage signal in a sensor coil corresponding to said amount of magnetization.

14. A method in accordance with claim 10, wherein said step of sensing comprises sensing a voltage signal in a sensor coil corresponding to said amount of magnetization.

* * * * *

UNITED STATES PATENT AND TRADEMARK OFFICE
CERTIFICATE OF CORRECTION

PATENT NO. : 5,722,317
DATED : March 3, 1998
INVENTOR(S) : Ghiron et al.

Page 1 of 2

It is certified that error appears in the above-identified patent and that said Letters Patent is hereby corrected as shown below:

Column 3, line 56, delete "healing" and insert --heating-- therefor

Column 5, line 58, delete "an"

Column 7, line 12, delete "fi" and insert --if-- therefor

Column 7, line 64, delete "mount" and insert --amount-- therefor

Column 9, line 64, delete "confirmed" and insert --confined-- therefor

UNITED STATES PATENT AND TRADEMARK OFFICE
CERTIFICATE OF CORRECTION

PATENT NO. : 5,722,317
DATED : March 3, 1998
INVENTOR(S) : Ghiron et al.

It is certified that error appears in the above-identified patent and that said Letters Patent is hereby corrected as shown below:

Column 13, line 27, delete "sensing" and insert --sensor-- therefor

Signed and Sealed this

Eighth Day of September, 1998

Attest:

BRUCE LEHMAN

Attesting Officer        Commissioner of Patents and Trademarks